United States Patent Office 2,903,428
Patented Sept. 8, 1959

2,903,428

FIRE RESISTANT HYDRAULIC FLUID AND LUBRICATING COMPOSITION

Douglas H. Moreton, Pacific Palisades, Calif., assignor to Douglas Aircraft Company, Inc., Santa Monica, Calif.

No Drawing. Application January 18, 1957
Serial No. 634,836

7 Claims. (Cl. 252—49.8)

This invention relates to a fluid composition useful particularly for transmitting power in hydraulic power systems and especially as a non-flammable hydraulic fluid in the hydraulic systems of aircraft.

A number of fluids are known which are intended for use to transmit power in hydraulic systems including some known fluids intended for use in the hydraulic systems of airplanes. However, the hydraulic power systems of aircraft for operating various mechanisms of an airplane impose stringent requirements on the hydraulic fluid used. Not only must the hydraulic fluid for aircraft meet stringent functional and use requirements but in addition such fluid should be as highly non-flammable as possible and must be sufficiently non-flammable to satisfy aircraft requirements for fire resistance. The viscosity characteristics of the fluid must be such that it may be used over a wide temperature range: that is, adequately high viscosity at high temperature, low viscosity at low temperature and a low rate of change of viscosity with temperature. Its pour point should be low. Its volatility should be low at elevated temperatures of use and volatility should be balanced; that is, selective evaporation or volatilization of any important component should not take place at the high temperatures of use. It must possess sufficient lubricity and mechanical stability to enable it to be used in the self-lubricated pumps, valves, et cetera employed in the hydraulic systems of aircraft which are exceedingly severe on the fluid used. It should be chemically stable to resist such chemical reactions as oxidation, decomposition, et cetera so that it will remain stable under conditions of use against loss of desired characteristics due to high and sudden changes of pressure, temperature, high shearing stresses, and contact with various metals which may be, for example, aluminum, bronze, steel, et cetera. It should also not deteriorate the gaskets or packings of the hydraulic system. It must not adversely affect the materials of which the system is constructed, and in the event of a leak should not adversely affect the various parts of the airplane with which it may accidentally come in contact. It should not be toxic or harmful to personnel who may come in contact with it. Furthermore, in addition to all such requisites for aircraft use, the fluid must be sufficiently non-flammable to meet aircraft requirements.

Numerous hydraulic fluid mixtures have been suggested. Light petroleum oil fractions to which suitable pour point depressants, viscosity index improvers, inhibitors, et cetera have been added are among the best so far proposed and these have been used somewhat extensively as aircraft hydraulic fluids. These materials, however, are too readily flammable, have a low autogenous ignition temperature, burn readily once ignited and have a high heat value. These characteristics are particularly undesirable in aircraft where necessity dictates the use of hydraulic lines in close proximity to electrical systems and to engines where a leakage of hydraulic fluid at high pressure through a crash of the airplane or failure of the hydraulic system while in flight may result in fire. None of these prior materials will meet the requirements of an aircraft hydraulic fluid and at the same time be sufficiently non-flammable to meet this exceedingly important requirement for aircraft use.

In many hydraulic systems power must be transmitted and the frictional parts of the systems lubricated by the hydraulic fluid used. The parts which are so lubricated include the frictional surfaces of the source of power, which is usually a pump, valves, operating pistons and cylinders and fluid motors. The hydraulic system may be of either the constant-volume or the variable-volume type of system.

The pumps may be of various types, including the piston-type pump, more particularly the variable-stroke piston pump, the variable-discharge or variable-displacement piston pump, radial-piston pump, axial-piston pump, in which a pivoted cylinder block is adjusted at various angles with the piston assembly, for example, the Vickers Axial-Piston Pump, or in which the mechanism which drives the pistons is set at an angle adjustable with the cylinder block; gear-type pump, which may be spur, helical or herringbone gears, variations of internal gears, or a screw pump, or vane pumps. The valves may be stop valves, reversing valves, pilot valves, throttling valves, sequence valves or relief valves. Fluid motors are usually constant- or variable-discharge piston pumps caused to rotate by the pressure of the hydraulic fluid of the system with the power supplied by the pump power source. Such a hydraulic motor may be used in connection with a variable-discharge pump to form a variable-speed transmission.

Accordingly, a large number of requirements are placed on the method of performing these functions of transmitting power in and lubricating the frictional parts of such hydraulic systems, depending upon the particular hydraulic system and its particular use. Among the stringent requirements of the method of transmitting power in and lubricating the parts of such a system are that it must be done by means of a fluid having satisfactory properties such as low viscosity at low temperatures of use, high viscosity at high temperatures of use, low rate of change of viscosity with temperature over the temperature range of use, particularly high viscosity index, lubricating properties, density, chemical stability, resistance to oxidation, resistance to emulsification, resistance to the formation of gum or sludge.

Good lubricating properties are especially important. These particularly include lubricity and film strength. Good lubricity and film strength lessen wear of moving parts in pumps and valves where the clearance between frictional surfaces may be so small that only microscopically thin films of lubricant are possible. Pressures between some of the moving parts may be very high. To avoid excessive wear or seizure, especially in the case of high fluid pressure, the hydraulic fluid should provide a strong lubricating film which will resist the pressure and wiping action between the moving parts at the temperatures of operation. Wear of the parts of a hydraulic system allows internal leakage and excessive frictional heat. Load-carrying capacity or lubricity is also important in some hydraulic systems. Wear at the glands and stuffing boxes of the hydraulic system is undesirable because it leads to external leakage of the fluid. Accordingly, it is desirable that the hydraulic fluid also lubricate the areas of contact with the sealing means. DC-4 Maintenance Manual, volume III, Section 1, Hydraulics, Douglas Service, April 1947, pages 10 and 11, and February 1948, pages 10 and 11, all published by Douglas Aircraft Company, Inc., Santa Monica, California, disclose hydraulic systems for airplanes which are illustrative of the type of hydraulic system to which my invention relates. Also, the cabin supercharger drive system of the DC-6 airplane, described in "Douglas Service," February 1948, published by Douglas Aircraft Company, Inc., is illustrative.

Thus the requirements for the hydraulic system of an airplane are particularly severe, and include a good lubricity to effectively lubricate the moving parts of the system, satisfactory viscosity at low as well as high temperatures at which the aircraft may have to operate, low rate of change of viscosity with temperature, particularly high viscosity index, stability under conditions of use against loss of the desired characteristics due to high and sudden changes of pressure, temperature, high shearing stresses, non-corrosiveness to metal parts which may be bronze, aluminum, steel et cetera, and the property of not deteriorating gaskets or packings, and in addition to all such requirements for aircraft use, the fluid must also be highly non-flammable or fire-resistant. The parts of the hydraulic system of aircraft are required to be as light in weight as possible and this factor results in imposing additional severe lubrication requirements and usually higher fluid temperatures.

Among the particular frictional surfaces which must be lubricated are hard steel on hard steel, particularly ball bearings and gear teeth, hard steel on cast iron, particularly sliding friction between such surfaces, hard steel on bronze or alloy bronze, such as between the steel piston and bronze cylinder of a Vickers pump, and metal in contact with elastomer seals, particularly steel or bronze on neoprene, Buna N, butyl rubber, silastic rubber, and natural rubber. The hard steel may be chrome plated.

In accordance with this invention, the discovery has been made that hydraulic fluids surprisingly satisfactory for aircraft hydraulic systems can be made by compounding a relatively small proportion of a suitable resinous or polymerized alkyl methacrylate (poly alkyl methacrylate) with a major proportion of a suitable dialkyl phenyl phosphite.

The dialkyl phenyl phosphates suitable for the purpose of this invention are those in which the number of carbon atoms in each of the alkyl groups is from 4 to 8 and the total number of carbon atoms in the two alkyl groups is from 8 to 12. The alkyl groups may be straight or branched chain. For example, the following phosphates may be used: dibutyl phenyl phosphate, butyl amyl phenyl phosphate, butyl hexyl phenyl phosphate, butyl heptyl phenyl phosphate, butyl octyl phenyl phosphate, diamyl phenyl phosphate, amyl hexyl phenyl phosphate, amyl heptyl phenyl phosphate, and dihexyl phenyl phosphate. Of these compounds, dibutyl phenyl phosphate and butyl 2-ethylhexyl phenyl phosphate are preferred.

The polyalkyl methacrylates suitable for the purpose of this invention are in general those resulting from the polymerization of alkyl methacrylates in which the alkyl group has from 4 to 8 carbon atoms. The molecular size of the polymerized alkyl methacrylate should be great enough to increase the viscosity of the dialkyl phenyl phosphate to which added and small enough to be compatible therewith. In general, the average molecular weight will be within 8,000 to 12,000 and the molecular weight range from 2,000 to 18,000.

In compounding the compositions of this invention, the alkyl methacrylate polymer may be added to the phosphate, or the monomer may be polymerized in situ in the phosphate. Since the compatibility of the particular polyalkyl methacrylate used in the composition is not the same with all of the dialkyl phenyl phosphates which may be used, the proper combination of methacrylate and phosphate must be used in order to obtain compositions having the optimum characteristics as hydraulic fluids and lubricants. In general, it will be found that the lower the total number of carbon atoms in the alkyl groups of the phosphate the lower should be the alkyl group of the methacrylate. For example, it has been found that poly butyl, poly amyl, poly hexyl, and poly octyl methacrylates may be used with butyl 2-ethylhexyl phenyl phosphate, but only poly butyl, poly amyl, and polyhexyl can be used with dibutyl phenyl phosphate because poly octyl methacrylate is not soluble in and is not compatible with dibutyl phenyl phosphate so as to increase its viscosity index and viscosity at elevated temperatures (210° F., for example).

The polyalkyl methacrylate should be in sufficient proportion to increase the viscosity at elevated temperatures (210° F., for example) and to increase the viscosity index, preferably to at least 100, or more preferably to above 150. Usually a minor proportion and particularly from 0.2 to 10 percent by volume of the polyalkyl methacrylate (exclusive of any solvent) will be found satisfactory, and preferably a proportion within the range from 2 to 6 percent. This percentage of polyalkyl methacrylate is based on the sum of the methacrylate and phosphate as being 100 percent.

It is an especially significant feature of the compositions of my invention that in addition to having a large number of properties making them suitable for the purposes previously described, they have a very surprising combination of high fire-resistance or non-flammability and low viscosity at extremely low temperatures, such as −40° F., together with an adequately high viscosity at such operating temperatures as 100° F. and 210° F. Moreover, the resulting viscosity index is unexpectedly high. All these striking factors must be taken in consideration with the fact that the compositions are homogenous; that is, the components in accordance with my invention are surprisingly and unexpectedly compatible not only at the time of compounding but also during use.

The following examples will further illustrate my invention:

*Example 1*

About 3 percent by weight of a poly butyl methacrylate having an average molecular weight of about 9,000 and a range of about 2,000 to 14,000 was dissolved in about 97 percent by weight of dibutyl phenyl phosphate at room temperature. The resulting composition had the following surprising combination of properties:

Viscosity at:
210° F _____ centistokes__ 4.35
100° F _____ do____ 12.50
−40° F _____ do____ 586
−65° F _____ do____ <2500
Viscosity index_____ 220
Pour point_____ °F__ Below −85
 No cloud to −85° F.
Autogenous ignition temperature_____°F__ 1100

This combination of properties is surprising and this fluid is especially satisfactory as a fire-resistant hydraulic fluid for aircraft. It is especially unexpected that this particular poly butyl methacrylate was compatible through this wide temperature range and so effective to increase the viscosity index to such a high value as 220 and thicken, that is, for example, increase the viscosity at such elevated temperature as 210° F. to the useful value of 4.35 centistokes, while at the same time the viscosity at the low temperatures is so surprisingly low.

*Example 2*

About 4.5 percent by weight of a poly hexyl methacrylate having an average molecular weight of about 8,500 and a range of about 2,000 to 14,000 was dissolved in about 95.5 percent by weight of dibutyl phenyl phosphate at room temperature. The resulting composition had the following surprising combination of properties:

Viscosity at:
210° F _____ centistokes__ 3.78
100° F _____ do____ 10.83
−40° F _____ do____ 467
Viscosity index_____ 210
Pour point_____ °F__ −85
 No cloud to −85° F.
Autogenous ignition temperature ____°F__ −1100

This combination of properties is surprising and this fluid is especially satisfactory as a fire-resistant hydraulic fluid for aircraft. It is especially unexpected that this particular poly hexyl methacrylate was compatible through this wide temperature range and so effective to increase the viscosity index to such a high value as 210 and thicken, that is, for example, increase the viscosity at such elevated temperature as 210° F. to the useful value of 3.78 centistokes, while at the same time the viscosity at the low temperatures is so low.

Thus, it will be seen in accordance with my invention it is possible to make compositions with dibutyl phenyl phosphate having a surprising combination of properties particularly including a fire resistance as indicated by an autogenous ignition temperature above 1000° F., a viscosity at 210° F. above 3 centistokes and a viscosity at −40° F. below 1000, providing a useful composition throughout an exceedingly wide temperature range. Moreover, in addition to the specified combination of properties the fluids in accordance with my invention are otherwise satisfactory as fire-resistant hydraulic fluids for aircraft as pointed out above.

*Example 3*

A poly octyl methacrylate having an average molecular weight of about 10,000 and a range of about 5,000 to 18,000, dissolved in 45 percent by volume of a light petroleum oil of 200° F. flash point, obtained from the Rohm and Haas Company, Philadelphia, Pennsylvania under its trademark designation Acryloid HF–855, in proportion of 10 percent by volume was mixed with and dissolved into 90 percent by volume of butyl 2-ethylhexyl phenyl phosphate. In this case the light petroleum acted as a mutual solvent for the poly octyl methacrylate and the phosphate and facilitated making the desired liquid solution. Since only a small proportion (10 percent) of the commercial Acryloid HF–855 was added to the phosphate, the proportion of the light petroleum oil was not great enough to impart any substantially undesirable properties to the final liquid product. The resulting composition had the following surprising combination of properties:

Viscosity at:
   210° F. _____ 4.84 centistokes.
   100° F. _____ 15.6 centistokes.
   −40° F. _____ 1290 centistokes.
Viscosity index _____ 230.
Pour point _____ −85° F.
Cloud _____ None.
Crystallization at extreme low temperatures _____ None.
Autogenous ignition temperature (Glass) _____ 1050° F.
Hot manifold test at 1300° F., AMS 3150 _____ Would not ignite.
Swell on butyl rubber:
   Seven days at 160° F. _____ 9 percent.
   Three days at 160° F. _____ 8.6 percent.

The butyl 2-ethylhexyl phenyl phosphate used in the example above had the following properties:

Viscosity in centistokes:
   210° F. _____ 1.89
   100° F. _____ 6.30

These compositions of my invention were found surprisingly satisfactory for transmitting power in and lubricating the parts of an airplane hydraulic system having a Vickers Axial-Piston Pump as the power source. In addition, these compositions also have a high degree of non-flammability or fire-resistance making them eminently suitable as hydraulic fluids for airplanes. These compositions were found especially suitable as lubricants for the frictional surfaces of the hydraulic system. These particularly include the lubrication of the metal-on-metal and metal-on-elastomer surfaces referred to hereinabove. This lubrication is effected by maintaining a film of the composition between the frictional surface. It is especially surprising that both functions of transmitting power and lubrication can be so satisfactorily performed by the compositions of this invention while at the same time such compositions are eminently satisfactory in other respects for aircraft use.

The foregoing describes my invention in its preferred aspects, and illustrates my invention by way of specific examples, but alterations and modifications may be made thereof without departing from the invention herein disclosed. It will be understood that additives such as antioxidants, corrosion inhibitors, etc. may be added, if desired, without departing from my invention as disclosed and claimed.

This application is a continuation-in-part, of my copending applications Serial No. 240,271, filed August 3, 1951, now abandoned, which in turn is a continuation-in-part of my application Serial No. 184,913, filed September 14, 1950, now abandoned, Serial No. 184,532, filed September 12, 1950, now abandoned and Serial No. 404,799, filed January 18, 1954.

Having described my invention, I claim:

1. The composition consisting essentially of a dialkyl phenyl phosphate wherein the number of carbon atoms in each of the alkyl groups is from 4 to 8 and the total number of carbon atoms in the two alkyl groups is from 8 to 12 and a sufficient proportion within the range of 0.2 to 10 percent by weight of a polyalkyl methacrylate in which the alkyl group has from 4 to 8 carbon atoms, said methacrylate having an average molecular weight of about 8,000 to 12,000 and a molecular weight range within the range of about 2,000 to 18,000 and being compatible with said dialkyl phenyl phosphate and increasing the viscosity index above 150.

2. The composition consisting essentially of butyl 2-ethylhexyl phenyl phosphate and from 2 to 6 percent of polyoctyl methacrylate, having an average molecular weight of about 10,000 and a molecular weight range of about 5,000 to 18,000 said composition having a viscosity index of above 150.

3. The fire-resistant hydraulic fluid and lubricant having an autogenous ignition temperature above 1000° F., a viscosity at −40° F. below 1,000 centistokes, a viscosity at 210° F. above 3 centistokes and a viscosity index above 150 consisting essentially of dibutyl phenyl phosphate and a sufficient proportion within the range of 0.2 to 10 percent by weight of poly alkyl methacrylate in which the alkyl radicals have 4 to 6 carbon atoms having an average molecular weight of from 8,000 to 12,000 and a molecular weight range within the range of about 2,000 to 14,000 compatible with said dibutyl phenyl phosphate and increasing the viscosity index above 150 and the viscosity at 210° F. to above 3 centistokes.

4. The composition as defined in claim 3 in which said poly alkyl methacrylate is poly butyl methacrylate.

5. The composition as defined in claim 3 in which said poly alkyl methacrylate is poly amyl methacrylate.

6. The composition as defined in claim 3 in which said poly alkyl methacrylate is poly hexyl methacrylate.

7. The composition consisting essentially of dialkyl phenyl phosphate in which each of the alkyl radicals has from 4 to 8 carbon atoms and the total number of carbon atoms for both alkyl radicals is from 8 to 12, and from 0.2 to 10 percent by weight of a poly alkyl methacrylate having an average molecular weight of about 8,000 to 12,000 and a molecular weight range within the range of about 2,000 to 18,000 compatible with said phosphate and increasing the viscosity index above 150.

References Cited in the file of this patent

UNITED STATES PATENTS 2,698,837    Gamrath et al. _____ Jan. 4, 1955

UNITED STATES PATENT OFFICE
CERTIFICATE OF CORRECTION

Patent No. 2,903,428                                September 8, 1959

Douglas H. Moreton

It is hereby certified that error appears in the printed specification of the above numbered patent requiring correction and that the said Letters Patent should read as corrected below.

Column 3, line 38, for "phosphite" read -- phosphate --; column 4, line 75, for "-1100" read -- 1100 --.

Signed and sealed this 29th day of March 1960.

(SEAL)
Attest:

KARL H. AXLINE                                           ROBERT C. WATSON
Attesting Officer                                       Commissioner of Patents